Jan. 18, 1944.   H. D. STEVENS   2,339,551
TIRE BUILDING APPARATUS
Filed July 8, 1941   4 Sheets-Sheet 1

Inventor
HORACE D. STEVENS

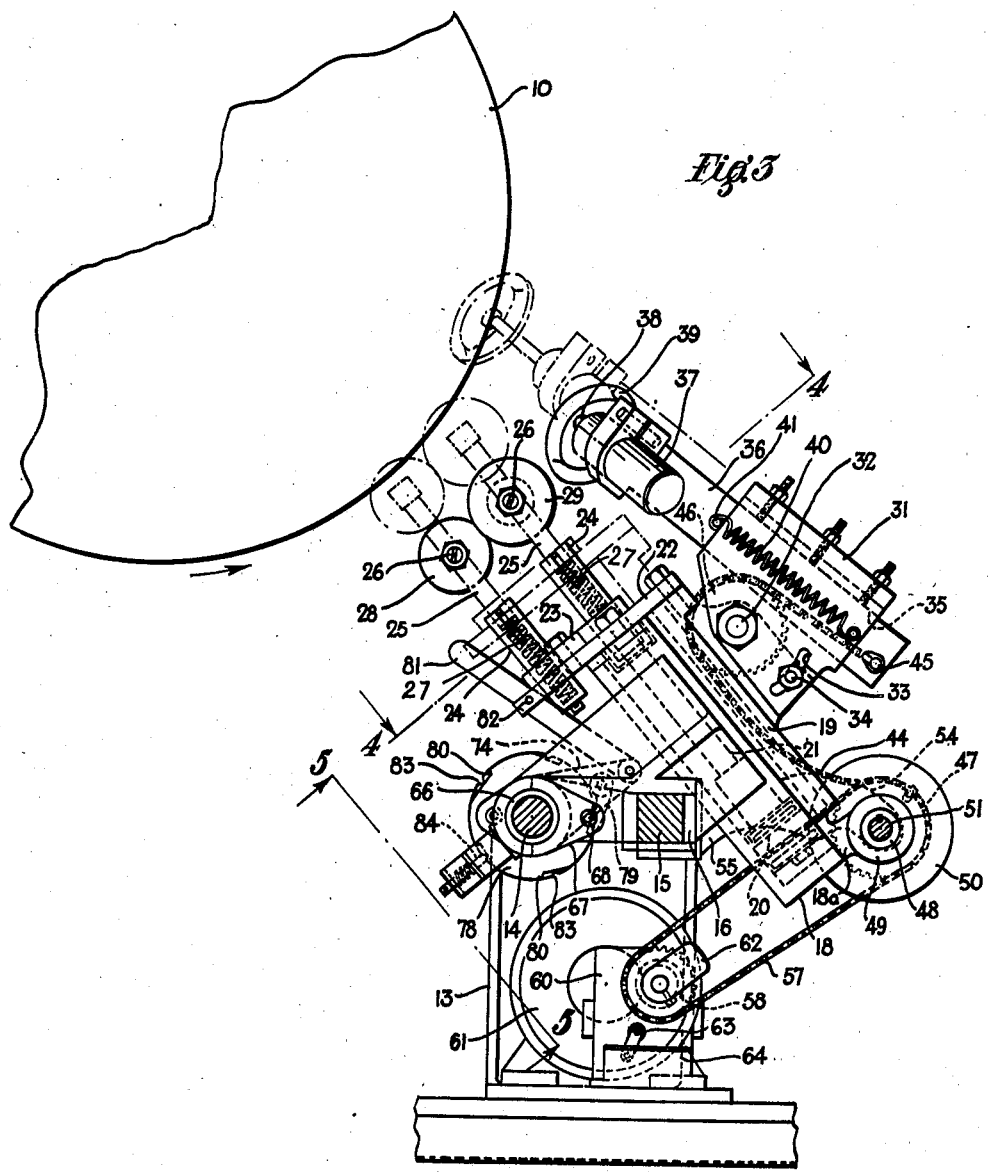

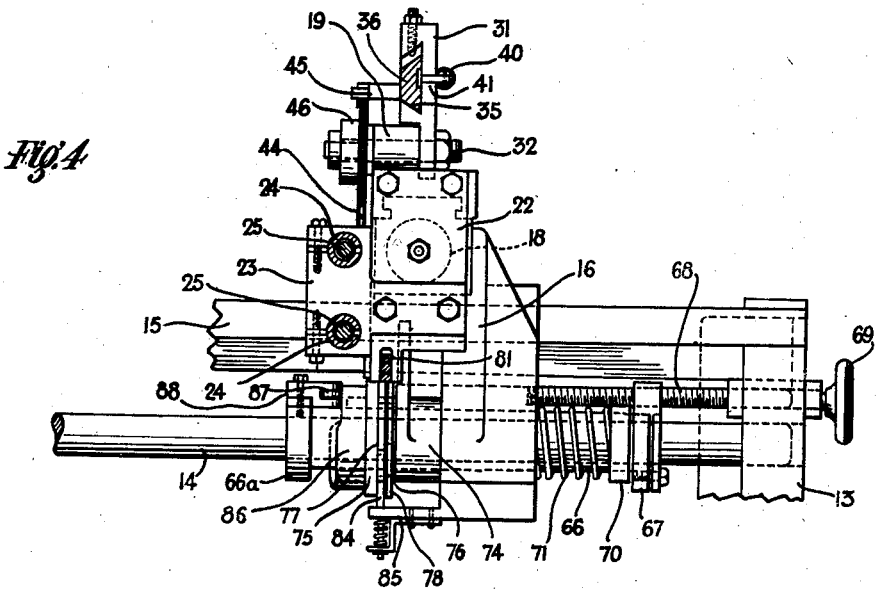
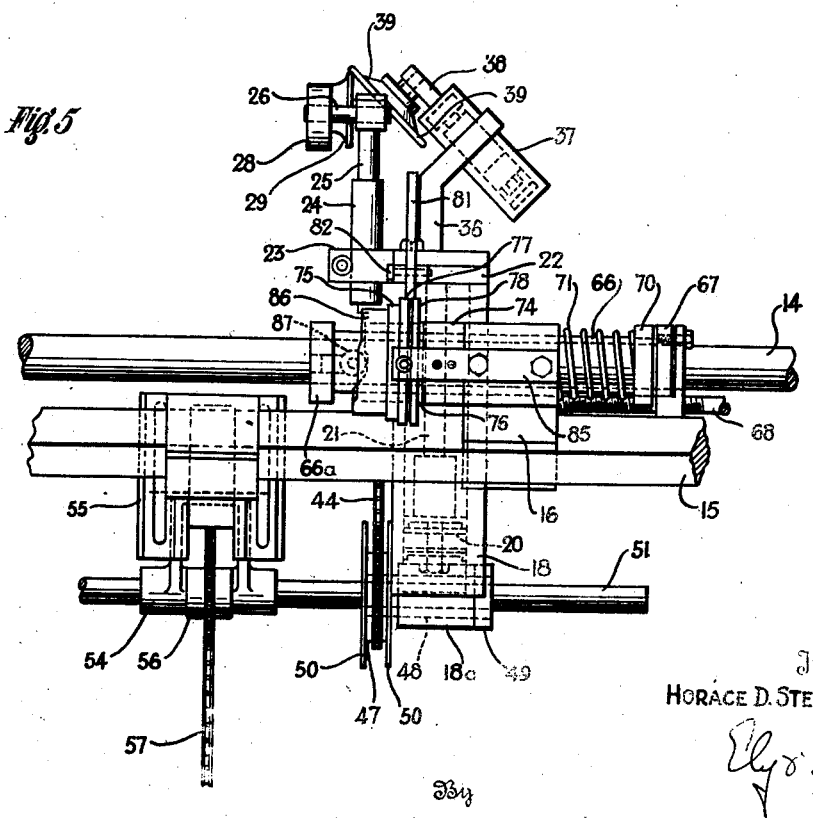

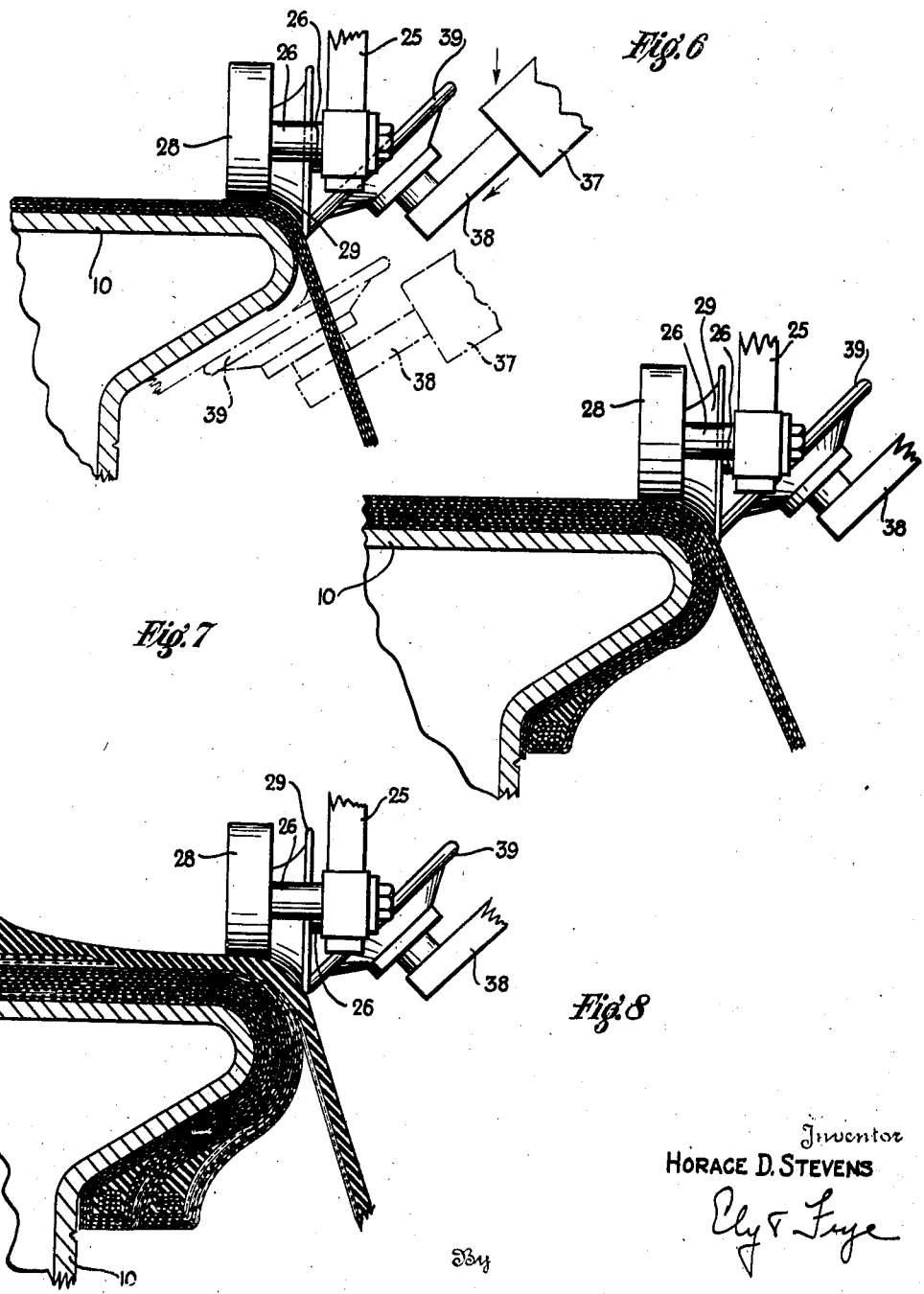

Patented Jan. 18, 1944

2,339,551

UNITED STATES PATENT OFFICE 2,339,551

TIRE BUILDING APPARATUS

Horace D. Stevens, Akron, Ohio, assignor to The Firestone Tire & Rubber Company, Akron, Ohio, a corporation of Ohio Application July 8, 1941, Serial No. 401,495

18 Claims. (Cl. 154—10)

This invention relates to tire building apparatus, and more especially it relates to a mechanism for operating upon the fabric plies of a tire casing after said plies have been applied to a rotatable tire-building form or drum.

The apparatus is of primary utility in operative association with tire building drums for the manufacture of large, heavy-duty pneumatic tire casings such as are composed of ten or twelve fabric plies, and which comprise at least two bead cores in each marginal bead. In the manufacture of a tire of the character mentioned by the drum-built process, the bead portions of the tire require to be constructed in substantially the same positions they occupy in the completed tire since heavy, double-core beads may not be twisted or deformed during the shaping of the tire to conventional tire shape. Accordingly, the tire building drums are formed with obliquely undercut side faces upon which the bead portions of the tire are built. Tire building fabric is applied to the drum in strips that are transversely flat, and extend well beyond the lateral margins of the drums so as to be capable of being folded radially inwardly about said margins of the drum and thus to be laid upon the undercut sides thereof, either under or over the bead cores thereon as the case may be. Usually such folding of the fabric plies is effected concurrently upon two or four fabric plies. The tire building apparatus constituting the subject matter of this invention is employed for so folding the fabric plies around the lateral margins of the tire building drum.

It will be apparent that as successive plies of fabric are folded around the lateral margins of the tire building drum, the over-all width of the tire structure thereon is progressively increased so that if optimum results are to be obtained the position of the tools that operate upon the fabric, to fold the same, must be adjusted accordingly. Therefore, one of the chief objects of the invention is to provide tire building apparatus comprising fabric-stitching tools that automatically have their positions adjusted, relatively of the tire, after each time that they operate upon any tire.

One pair of the tire stitching tools as they bear against the work are required to be moved parallel to the oblique sides of the building drum slowly so as progressively to lay the marginal portions of the fabric plies thereon. While springs or fluid pressure means are well adapted for pressing the tools against the work, such means cannot be controlled so as to move the tools parallel to the sides of the drum at determinate speed. Accordingly it is another object of the invention to provide mechanical means that operates in conjunction with the fluid pressure means to impart the desired movement to at least one pair of the stitching tools. Other objects will be manifest as the description proceeds.

Of the accompanying drawings:

Fig. 3 is a section, on a larger scale, on the line 3—3 of Fig. 1;

Fig. 4 is a section on the line 4—4 of Fig. 3;

Fig. 5 is a section on the line 5—5 of Fig. 3;

Fig. 6 is a fragmentary sectional view of a tire building drum and four plies of fabric thereon, and the stitching tools of the apparatus of the invention in operative association therewith; and Fig. 7 and Fig. 8 are views similar to Fig. 6 showing the tools in the positions they occupy at subsequent stages of operation.

Figure 1:
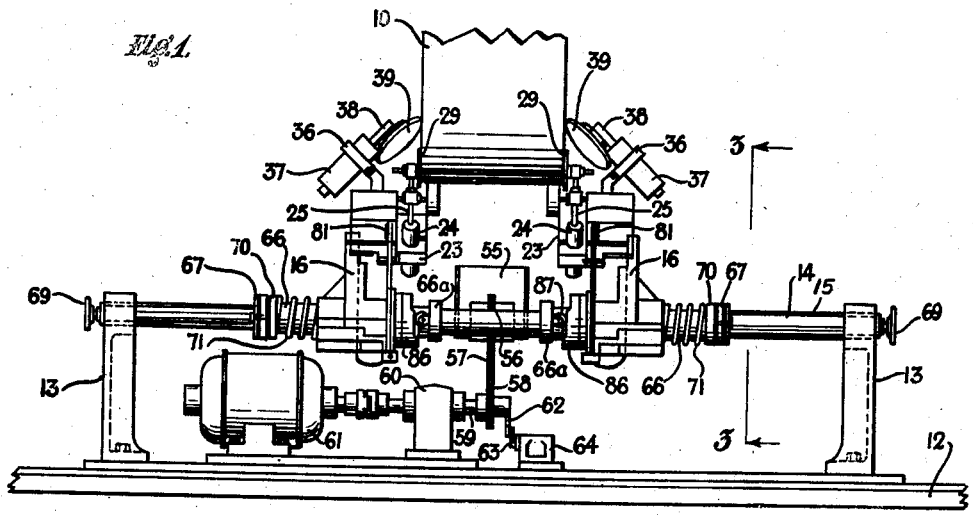
Fig. 1 is a front elevation of apparatus embodying the invention, and a rotatable tire building drum upon which tires are built by use of said apparatus.

Referring to the drawings, there is shown a sectional, collapsible tire building form or drum 10, of any known or preferred construction, such as commonly is used for the fabrication of pneumatic tire casings. The drum is mounted upon a horizontal spindle and is rotated in the usual manner in the direction indicated by the arrows in Figs. 2 and 3. The spindle that supports the drum and the tire machine of which the spindle is an element are not a part of the present invention and do not require to be illustrated herein.

The tire machine is mounted upon a base plate 12, and also mounted on the latter, at each side of the drum 10 and somewhat rearwardly of the axis thereof, are upright supporting brackets or standards 13, 13 that support a stitcher shaft 14 and a slide bar 15 by engagement with the respective ends thereof. The shaft 14 and bar 15 are disposed parallel to each other in the same horizontal plane, the shaft being circular in section and the bar being of square section. As is best shown in Figs. 1 and 3, the shaft 14 and bar 15 have a pair of carriages 16, 16 mounted thereon and adapted for movement longitudinally of said shaft and bar, said carriages being positioned at opposite sides of the central plane of the drum 10. Said carriages are identical in construction and operation, as are the mechanisms carried thereby, and for this reason but one of them need be described in detail herein.

Carried by each carriage 16 is a double acting fluid pressure operated cylinder 18 that is so angularly supported that the axis thereof is disposed radially of the axis of the drum 10. Formed along the upwardly presented side of the cylinder 18 and extending from end to end thereof is a slideway upon which a slide 19 is mounted. Within the cylinder 18 is the usual piston 20 carrying a piston rod 21, and secured to the outer end of the latter is a flat stitcher plate 22 that rests against the end of the cylinder 18 when the piston thereof is in retracted position. The upper end of the slide 19 is attached to the stitcher plate 22 whereby said slide is moved toward and away from the drum 10 by the operation of the cylinder 18. Mounted upon the top of the stitcher plate 22 is a T-shaped stitcher holder 23, the major portion of which overhangs said plate 22 on the side thereof that is nearest the central plane of the drum 10. As is best shown in Fig. 4 the holder 23 has two sockets formed therein and adjustably clamped in said sockets are respective tubular stem holders 24, the latter being parallel to each other and to the axis of cylinder 18. Slidably mounted in each holder 24 is a spring-backed stem 25 that projects from the upper end thereof, and at its outer end carries a laterally projecting adjustable stud 26 upon which is journaled a rotatable tire-stitching tool presently to be described. The stems are provided with suitable means for retaining them in their holders against the force of the springs behind them, and also are provided with laterally projecting pins 27 that are received in respective axially extending slots in the holders for preventing angular or turning movement of the stems relatively of the holders.

The stitching tools carried by the two stems 25 of each carriage 16 are designated 28 and 29 respectively, and said tools are moved into engagement with the tire plies on the rotating drum 10 when the cylinder 18 is charged to move the parts carried on the end of its piston rod from their full line positions as shown in Figure 3 to the broken line positions shown therein. The tools 28, 29 are so arranged that tool 28 engages the work on the rotating drum 10 immediately in advance of the tool 29. The tool 28 is cylindrical in form and has a relatively wide peripheral face. The tool 29 is of general frusto-conical shape and has a peripheral surface that is concave in the direction of the axis of the tool. The tool 28 engages the work on the flat peripheral face of the drum 10 adjacent a rounded lateral margin of the latter, as best shown in Figs. 6 to 8. The tool 29 engages the work on a rounded lateral margin of the drum and initiates the folding of the marginal portion of the work around said margin of the drum.

Each carriage 16 has three stitching tools associated therewith, and for supporting and moving the third tool relatively of the drum, a bracket 31 is mounted upon the slide 19. The bracket 31 is angularly adjustable relatively of said slide 19 and to this end the bracket is pivotally secured to the slide at 32, there being an arcuate slot 33 in the bracket through which an adjusting bolt 34 extends and is secured to said slide. The lateral face of the bracket 31 nearest the plane of the drum 10 is formed with a dove-tail slideway 35, Fig. 4, and received in said slideway is a stitcher arm 36. The end portion of the latter that is nearest drum 10 is angular and inclined away from the drum, and adjustably clamped in said angular portion is a double-acting fluid pressure operated cylinder 37. The piston rod 38 of the latter is directed toward the drum 10, and has a disc-like stitching tool 39 swivelled on the outer end thereof on an axis perpendicular to the said piston rod. The arrangement is such that when the slide 19 is elevated to the position shown in broken lines in Figure 3 the tool 39 is carried to the proximity of the rounded lateral margin of the drum. Immediately thereafter charging of the rear end of cylinder 37 projects the piston rod thereof and carries the tool 39 into engagement with the work on the drum in the position shown in full lines in Figs. 6 to 8. The stitcher arm 36 normally is retained in retracted position relatively of the bracket 31 by means of a tension spring 40 that is connected at one end to a fixed point on the bracket 31 and at its other end is connected to a stud 41 that projects laterally from said stitcher arm, said stud also limiting the retractive movement of the stitcher arm under the impetus of said spring.

The bracket 31 is angularly adjusted so that the stitcher arm 36 is disposed substantially radially of the axis of the drum 10. Thus when the tool 39 is in the position shown in full lines in Figure 6, movement of the stitcher arm 36 outwardly against the pull of the spring 40 will move said tool 39 past the rounded margin of the drum and into position beside the undercut sidewall of the drum against which it is urged by the cylinder 37. Thus the tool is enabled to lay the tire fabric on the drum completely around the rounded lateral margin of the drum and to initiate its application to the sidewall of the drum as shown in broken lines in Figure 6. It is required that such movement of the stitcher arm be at relatively slow uniform speed, and since this is impossible of attainment by use of fluid pressure operated means, mechanically operated mechanism is provided.

To this end a sprocket chain 44 is provided, said chain having one of its end connected to a stud 45 that projects from the stitcher arm 36 at the lower or rear end thereof. The sprocket chain 44 is trained over a sprocket 46 that is journaled on the same stud that constitutes the pivotal support 32 of the bracket 31, the other end of said sprocket chain being secured to a sprocket 47. The latter is fixedly secured upon one end of a bushing 48 that is journaled in a bearing bracket 18a formed on the lower end of the cylinder 18, the other end of bushing 48 having a collar 49 thereon to retain it in place. The sprocket 47 has guide plates 50 positioned close to each side thereof to assure that the chain always will mesh with the sprocket. Extending through the bushing 48 is one end portion of a rotatable shaft 51, the bushing being slidably movable axially of the shaft and being keyed thereto so as to be driven thereby. The other end of shaft 51 is similarly connected to the other stitching unit, the same being shown in Figure 1 but not shown or described in detail. The arrangement is such that the brackets 18a assist in supporting the shaft 51.

Also supporting the shaft 51 is a bearing 54 that is adjustably mounted upon a bracket 55 that is secured to the slide bar 15, between the two stitching units as is best shown in Figure 1. The bearing 54 is a two-arm structure and between the arms thereof a sprocket 56 is mounted upon the shaft 51 and secured thereto. For driving the shaft 51, a sprocket chain 57 is trained about the sprocket 56, and about a sprocket 58 that is mounted upon a shaft 59 of a reduction speed device 60 that is located on the base plate 12 below the apparatus, said device 60 having driving connection with a reversible electric motor 61. Automatically operated switch means (not shown) is provided for energizing the motor 61 at the proper time during a cycle of operation of the apparatus, and upon being so energized the motor rotates in the direction that drives the chain 57 in the direction indicated by the arrow in Figure 2. It is desired that the motor 61 drive the shaft 59 less than one complete revolution and then to reverse its drive and return the shaft to its original angular position. To this end the shaft 59 has a cam 62 fixed thereon beside the sprocket 58, and projecting into the orbit of said cam is the operating lever 63 of a reversing switch that is enclosed in a suitable receptacle 64, said reversing switch being in the circuit of said motor and reversing the drive thereof after it has been energized automatically as previously mentioned.

Figure 2:
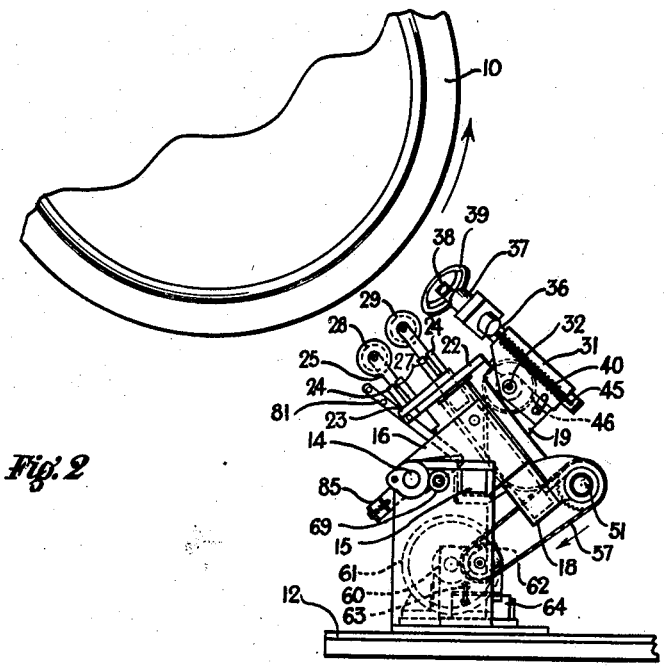
Fig. 2 is a side elevation thereof.

When the apparatus is in the inoperative position shown in Figure 2 and in full lines in Figure 3, the chain 44 is loose and hangs in a loop as shown. When the cylinder 18 is charged at its lower end and moves the stitching tools to the position shown in broken lines in Figure 3, the slack in said chain is substantially taken up. Thereafter when the motor 61 is energized, the shaft 51 is driven in the direction that turns the sprocket 47 in clockwise direction as shown in Figure 2, with the result that the chain 44 is wound onto said sprocket and thereby moves the stitcher arm 36 outwardly of its bracket 31, against the tension of the spring 40, which moves the stitching tool 39 radially of the drum 10. The rear end of cylinder 37 is charged a moment after the charging of the cylinder 18, thereby yieldingly urging the tool 39 against the rounded margin of the drum. Thus the tool 39 is acted upon by two impelling forces which cause it to move from the position shown in full lines in Figure 6 to the position shown in broken lines in the same figure, thereby rolling the fabric plies of a tire onto the undercut lateral face of the drum 10. After a determinate time interval the cylinders 18, 37 are reversed to withdraw the stitching tools from the work, and the motor 61 is reversed to enable the spring 40 to restore the stitcher arm 36 to its retracted inoperative position.

As previously stated, it is desirable that each unit of the apparatus be adjusted to a different position laterally of the drum each time after it has operated thereon to compensate for the increased width of the work on the drum as succeeding fabric plies are added thereto, the units returning to normal position after the final plies of the tire are mounted upon the drum. To this end respective elongated sleeves 66 are mounted upon the stitcher shaft 14, each of said sleeves extending through a carriage 16 and projecting from opposite sides thereof whereby the sleeves support the respective carriages, the latter being slidable axially on said sleeves. Each sleeve 66 is slidably keyed to the shaft 14 and may be adjusted axially thereof to assure the proper positioning of the stitcher units with respect to the drum 10 and to each other. For so axially adjusting the sleeves 66, each has the end thereof nearest a standard 13 provided with a lock-nut 67 of generally oval shape, said lock-nut having a lateral projection in which is a threaded bore. Received in said bore is an elongated feed screw 68 that is journaled in the adjacent standard 13 and provided with a knob 69 on the outer side of the latter for manual turning of the feed screw. Threaded onto the sleeve 66, beside the lock-nut 67, is an adjustable thrust-collar 70, and a compression spring 71 is mounted upon the sleeve between said thrust collar and the adjacent lateral face of the carriage.

Journaled upon the sleeve 66 and abutting the opposite lateral face of the carriage 16 is a crank or ratchet arm 74. Journaled upon this same end portion of the sleeve 66 is a centrally flanged sleeve 75, there being a thrust washer 76 positioned between the confronting faces of ratchet arm 74 and sleeve 75. Secured to the flange of sleeve 75 on the side thereof that confronts ratchet arm 74 is a circular lock plate 77 that abuts said flange and a circular ratchet plate 78 that abuts plate 77. A pawl 79, Figure 3, that is pivotally mounted upon the ratchet arm 74 rests its free end upon the perimeter of the ratchet plate 78, and the said perimeter is formed with a circumferential series of ratchet teeth 80, 80 with which the pawl 79 is engageable. The arrangement is such that oscillation of the ratchet arm 74 will effect step by step rotation of the ratchet plate 78, and the lock plate 77 and sleeve 75 that are connected therewith. For oscillating the ratchet arm 74 a link 81 has one of its ends pivotally connected to the free end thereof, the other end of said link being pivotally connected at 82 to a pair of ears formed on the stitcher holder 23, the arrangement being such that the ratchet plate 78 is indexed each time the stitching tools are retracted from the work by the charging of the outer end of the cylinder 18 while the inner end thereof is discharged. The lock plate 77 is provided for yieldingly retaining the ratchet plate 78 in the angular position to which it is indexed, said locking plate having its perimeter formed with a circumferential series of notches 83 corresponding in number to the ratchet teeth 80 of ratchet plate 78. Engageable in the notches 83, successively as the lock plate is rotated, is a spring pressed detent 84 that is carried by a suitable bracket 85, the latter being secured to the carriage structure 16 and having a lateral extension that projects to a point radially of the said lock plate. Keyed to the sleeve 75 on the opposite side of its central flange from the lock plate 77 is an annular cam 86 that has the end face thereof remote from said flange formed with a cam surface composed of a plurality of flat surfaces connected by intermediate sloped surfaces, said flat surfaces being at progressively increasing distances from said sleeve-flange. Bearing against the cam face of cam 86 is a cam roller 87 that is journaled in the end of a short arm or bracket 88, the latter being secured to a flange 66a on the end of sleeve 66. The arrangement is such that the spring 71 maintains the cam 86 and cam roller 87 in operative engagement at all times. Thus when the cam 86 is periodically indexed by the turning of the ratchet plate 78 as described, successive cam surfaces of the cam are moved into engagement with the cam roller 87, and as the cam thus increases the distance between the cam roller and the central flange of sleeve 75, the carriage, and all the mechanisms carried thereby, are moved laterally away from the central plane of the drum 10, against the force of spring 71. After successive indexing the cam surfaces of cam 86 return to point of starting and spring 71 restores the carriage 16 to its original position. Since the indexing is effected by the retraction of the piston 20 of cylinder 18, it will be apparent that the stitching tools 28, 29, and 39 are clear of the work on the drum 10 at such time.

As will be observed in Figure 3, the ratchet plate 78 is formed with five ratchet teeth 80 and the lock plate 77 is formed with five notches. Figures 4 and 5 show that the cam 86 is formed with five cam surfaces. The arrangement is such that the carriage 16 will be moved laterally from a first position to four different positions laterally thereof and then be returned to a first position at point of starting by each complete rotation of the cam 86. This arrangement is of particular applicability in the manufacture of pneumatic tire casings comprising ten fabric plies since the plies may be stitched down to the drum two plies at a time, the carriages 16 being moved laterally after each stitching operation to compensate for the extra width of the tire structure on the drum resulting from the addition of each pair of plies. The tire is completed when the cam 86 has made a complete revolution and the carriages have been moved back to point of starting, in position to operate upon the succeeding tire to be built on the drum. It is possible in some tire constructions to assemble the fabric plies on the drum in groups of four, and to stitch down the fabric four plies at a time. Thus a twelve-ply tire can be built on the drum and require the use of the stitching tools 28, 29, and 39 but three times, as is clearly shown in Figures 6 to 8. In the constructing of such a tire with the apparatus described, the ratchet plate 78 having five ratchet teeth and the cam 86 having five cam surfaces, the first operation of stitching down four fabric plies with the tools 28, 29 and 39 is effected in the usual manner, as shown in Figure 6. Then the operator, by utilizing the manual control with which the apparatus is provided, effects the operation of the cylinder 18 to elevate the stitching tools and immediately to lower them again, thus moving to carriages 16 laterally another step, that is, to the third position. Then the second four plies of fabric are applied to the drum and stitched down in the usual manner, as shown in Figure 7, after which the cylinder 18 again is charged and quickly discharged to move the carriages to the fifth position. In the latter position the other plies of the tire are applied to the drum, and stitched down by the stitching tools as shown in Figure 8. As the tools are retracted at the completion of the operation shown in Figure 8, the indexing mechanism moves the carriages 16 back to point of starting, ready for operation upon a succeeding tire to be built upon the drum.

It is believed that the operation of the apparatus will be apparent from the foregoing description thereof. The automatic re-positioning of the carriages 16 after each operation adapts the apparatus to the manufacture of tires of various sizes and different numbers of plies. The use of the electrically operated means for feeding the tool 39 radially of the drum while the tool is yieldingly urged toward the work by the fluid pressure cylinder 37 assures that the tool will move over the work at controlled speed and thereby operate in a superior manner. Because of the automatic features of the apparatus, a saving of time is effected in the manufacture of tires. It will be understood that the two stitcher units operate concurrently, the two cylinders 18 of the units being connected to a common fluid pressure supply pipe (not shown), and the motor-driven shaft 51 having operative connection with both units.

Modification may be resorted to without departing from the spirit of the invention or the scope thereof as defined by the appended claims.

What is claimed is:

1. Tire building apparatus of the character described comprising a pair of fabric-stitching units disposed at opposite sides of a tire building drum and operable against fabric plies thereon, and means automatically moving the units to different inoperative positions laterally of the drum after each time they operate thereon.

2. Tire building apparatus of the character described comprising a pair of fabric-stitching units disposed at opposite sides of a tire building drum, fabric-stitching tools carried by said units, means for moving said tools toward and away from the tire building drum so as to operate upon the fabric plies thereon, and means for moving the units as a whole to different distances apart from each other after each time the tools are retracted from operative position against the drum.

3. Tire building apparatus of the character described comprising a pair of fabric-stitching units disposed at opposite sides of a tire building drum, fabric stitching tools carried by said units, fluid pressure operated means for moving said tools radially of the drum so as to operate upon fabric plies thereon and subsequently to retract said tools to original position, and means operated mechanically by the retractive movement of the tools for moving the units as a whole to inoperative position successively at increased distances apart from each other to compensate for the increase in width of the drum as the result of the application of fabric plies thereto.

4. Tire building apparatus of the character described comprising a pair of fabric-stitching units disposed at opposite sides of a tire building drum, fabric stitching tools carried by said units, means moving said tools radially of the drum so as to operate upon fabric plies thereon and subsequently retracting said tools to point of starting, respective cam means for moving said units apart from each other a determinate distance to compensate for increase in width of the drum as the result of fabric plies added thereto, and means controlled by retractive movement of the tools for operating said cams.

5. Tire building apparatus comprising a fabric-stitching unit disposed beside a tire-building drum, manually operable means for adjusting the normal inoperative position of the unit laterally with relation to the drum, fabric stitching tools carried by the unit, means moving said tools radially of the drum into and out of engagement with a tire structure thereon, and means operating in timed relation to said tool moving means and independently of said manual adjustment means for moving the unit as a whole successively to different inoperative positions laterally with relation to said drum.

6. Tire building apparatus comprising a fabric-stitching unit disposed beside a rotatable tire building drum, manually operable means for adjusting the normal position of the unit with relation to the drum, fabric stitching tools carried by the unit, means moving the tools radially of the drum into and out of engagement with work thereon, and cam means operating in timed relation to said tool moving means and under impetus of the latter for moving the unit as a whole laterally with relation to said drum, independently of said manual adjustment means.

7. A combination as defined in claim 6 including yielding means opposing movement of the stitching unit by the cam.

8. Tire building apparatus comprising a supporting shaft disposed parallel to the axis of a tire building drum, a sleeve on said shaft, manually operated means for adjusting the position of the sleeve longitudinally of the shaft, a carriage supported in part upon said sleeve and relatively movable axially thereof, tire-stitching tools carried by said carriage, means carried by the carriage for projecting said tools toward the drum and retracting them therefrom, yielding means on the sleeve urging the carriage in one direction relatively of the sleeve, rotary cam means on the sleeve adapted to move the carriage relatively of the sleeve in opposition to said yielding means, and means connecting the cam means to the tool structure so as to be operated thereby upon retraction of the tools from the drum.

9. A combination as claimed in claim 8 in which the last mentioned means includes a ratchet connected to the cam and a pawl operatively connected to the tool structure.

10. A combination as defined in claim 8 in which the cam means includes a cam roller fixedly supported upon the sleeve, and a cam movable relatively of the sleeve with the carriage.

11. Tire building apparatus comprising a pair of fabric stitching units disposed at opposite sides of a tire building drum, tire-stitching tools carried by the respective units, fluid pressure operated means carried by the respective units for moving the stitching tools a determinate distance toward and away from the drum, radially thereof so as to operate upon the work thereon, and mechanically operated means for imparting additional movement radially of the drum at least to one of the fabric-stitching tools of each unit while the same is engaged with the work, said mechanically operated means being common to the two units.

12. Tire building apparatus comprising a fabric-stitching unit disposed beside a rotatable tire building drum, a stitching tool carried by the unit, fluid pressure operated means for moving the tool a determinate distance radially of the drum into and out of engagement with work thereon, and mechanically operated means for imparting additional movement to the tool radially toward the drum after it has engaged the work thereon, said last mentioned means comprising a lost motion connection with the tool, which lost motion is substantially taken up by the action of the fluid pressure means in moving the tool toward the drum.

13. A combination as defined in claim 12 including a second fluid pressure operated device for yieldingly urging the tool against the work on the drum in oblique relation to the direction of movement imparted thereto by the first mentioned fluid pressure operated means and the mechanically operated means.

14. Tire building apparatus comprising a fabric-stitching unit disposed beside a rotatable tire building drum, a stitching tool carried by said unit, fluid pressure operated means for moving the tool a determinate distance radially of the drum into and out of engagement with work thereon, and motor driven means for imparting a continuation of such movement to the tool radially of the drum after it has engaged the work thereon, said motor driven means comprising a slack connection with the tool, which slack is substantially taken up by movement of the tool toward the drum under impetus of said fluid pressure operated means.

15. Tire building apparatus comprising a fabric-stitching unit disposed beside a rotatable tire building drum, a stitching tool, a slidable support for said stitching tool carried by said unit, fluid pressure operated means for moving said support and tool a determinate distance radially of the drum so that the tool engages the work thereon, and motor driven means for sliding said tool support relatively of the remainder of the unit to impart a continuation of such movement to the tool radially of the drum after it has engaged the work thereon.

16. A combination as defined in claim 15 in which the motor driven means comprises a reversible motor having a lost motion connection with the slidable tool support.

17. Tire building apparatus comprising a fabric-stitching unit disposed beside a rotatable tire building drum, a stitching tool carried by said unit, a slidable support for said stitching tool carried on said unit and movable relatively thereof, fluid pressure operated means for moving said tool and its support radially toward and away from said drum, a reversible electric motor, and a sprocket chain operatively connecting said motor to said slidable tool support to operate the latter, said chain being of such length as to enable the tool support to be moved by the fluid pressure operated means without stretching the chain to taut condition.

18. A combination as defined in claim 17 including a fluid pressure cylinder carried by the slidable tool support adapted to urge the tool against the work on the drum at an oblique angle with relation to the movement of the tool under impetus of the first mentioned fluid pressure operated means and the motor driven means.

HORACE D. STEVENS.